(12) United States Patent
Suzuki et al.

(10) Patent No.: US 6,433,836 B1
(45) Date of Patent: Aug. 13, 2002

(54) CONTOUR EMPHASIZING CIRCUIT

(75) Inventors: Susumu Suzuki; Masanori Kurita, both of Kanagawa-ken (JP)

(73) Assignee: Fujitsu General Limited, Kawasaki (JP)

( * ) Notice: Subject to any disclaimer, the term of this patent is extended or adjusted under 35 U.S.C. 154(b) by 0 days.

(21) Appl. No.: 09/402,028

(22) PCT Filed: Mar. 25, 1997

(86) PCT No.: PCT/JP97/00997

§ 371 (c)(1),
(2), (4) Date: Sep. 24, 1999

(87) PCT Pub. No.: WO98/43412

PCT Pub. Date: Jan. 10, 1998

(51) Int. Cl.[7] .............................................. H04N 5/208
(52) U.S. Cl. ....................................... 348/625; 348/630
(58) Field of Search ................................ 348/625, 630, 348/627, 628, 629, 631, 26; 382/266; H04N 5/21, 5/208

(56) References Cited

U.S. PATENT DOCUMENTS 5,767,900 A * 6/1998 Tanji ........................... 348/625

FOREIGN PATENT DOCUMENTS

| JP | 62-154892 | 7/1987 |
|---|---|---|
| JP | 1-259464 | 10/1989 |
| JP | 3-171978 | 7/1991 |
| JP | 4-32372 | 2/1992 |
| JP | 7-143365 | 6/1995 |
| JP | 8-65548 | 3/1996 |
| JP | 8-163412 | 6/1996 |
| JP | 8-186 739 | 7/1996 |

* cited by examiner

*Primary Examiner*—Sherrie Hsia
(74) *Attorney, Agent, or Firm*—Flynn, Thiel, Boutell & Tanis, P.C.

(57) ABSTRACT

A contour emphasizing circuit is provided with a number-of-pixels changing circuit (37) which changes the numbers of pixels of digital R, G, and B signals, a gamma correction circuit (39) which performs gamma correction on the output of the circuit (37), a Y-signal generating circuit (36) which generates luminance signals from the output of the circuit (37), an contour extracting circuit (38) which extracts contour components from the output of the circuit (36), a coefficient multiplying circuit (42) which outputs contour components for R, G, and B by multiplying the extracted contour components by coefficients Kr, Kg and kb contour adding circuit (34r), (34g), and (34b) which respectively add the outputs of the circuit (39 and 42). Thus, the contour emphasizing circuit performs contour emphasis on the digital R, G, and B signals.

6 Claims, 8 Drawing Sheets

(a) A/D conversion when large signal is input (b) A/D conversion when contour emphasizing quantity is "large"

(a) Input Signal
(b) Contour Components
(c) Output Signal

CONTOUR EMPHASIZING CIRCUIT

TECHNICAL FIELD

The present invention relates to a contour emphasizing circuit, wherein a digital contour-emphasized video signal, on the basis of the input of an analog signal, is output, and is employed to produce contour-emphasized color video signals by a display device (for example, matrix type display device) which is digitally driven, such as a plasma display (referred only to as PDP) and liquid crystal display (referred only to as LCD).

BACKGROUND ART

In conventional CRT (Cathode Ray Tube) display device, contour emphasizing processing is carried out to achieve high picture quality implementation and high-pass characteristic compensation. The contour emphasizing circuit for carrying out this contour emphasizing processing is, as shown in FIG. 1, composed of a Y/C separation circuit 10, a color demodulation circuit 12, a contour extracting circuit, phase adjustment circuits 16, 18 and 20, an adder 22 and a matrix circuit 24.

The Y/C separation circuit 10 separates a Y (luminance) signal and a C (color) signal from the composite video signal (for example, compound color television signal) input to an input terminal 26, and the color modulation circuit 12 separates a Y signal, an R−Y (color difference) signal and a B−Y (color difference) signal on the basis of a Y signal and a C signal.

The contour extracting circuit 14 extracts the contour component Ye which is a high-pass component of a video signal on the basis of an adder 22.

The matrix circuit 24 prepares a signal adding the contour component Ye to the R (red), G (green) and B (blue) signals, respectively, on the basis of (Y+Ye) signals added by the adder 22, an (R−Y) and a (B−Y) signal phase-adjusted by phase adjustment circuits 18 and 20. That is to say, the matrix circuit 24 prepares R+Ye, G+Ye and B+Ye on the basis of the operations in following equations (1), (2) and (3). By outputting these R+Ye, G+Ye and B+Ye to the CRT-display device by means of output terminals 28r, 28g and 28b, videos contour-emphasized by this CRT display device are displayed.

$$(R-Y)+(Y+Ye)=R+Ye \quad (1)$$

$$(G-Y)+(Y+Ye)=G+Ye \quad (2)$$

$$(B-Y)+(Y+Ye)=B+Ye \quad (3)$$

(G−Y) in the above equation (2) is generated by the following equation (4).

When a video contour-emphasized by the matrix type display device driven by digital video signals (for example, R, G and B signals) like PDP and LCD is displayed, each signal of (R+Ye), (G+Ye) and (B+Ye) obtained in output terminals 28r, 28g and 28b in FIG. 1 is output to the display device after being digitized by the A/D (analog/digital) conversion circuit. However, in such a prior example, when a large amplitude signal is input to an input terminal 26, or when the contour emphasizing quantity (or contour emphasizing coefficient, the description is omitted, as it is similar afterwards) is "large", there is a problem that the correct operation cannot be obtained over the dynamic range of the A/D conversion circuit.

For example, when a large amplitude signal is input to the input terminal 26, by outputting a signal over the dynamic range of the A/D conversion circuit as shown at the left-hand side in FIG. 2(a) from output terminals 28r, 28g and 28b, there are problems that signals exceeding an upper conversion reference voltage value VRT (for example, 5 volts) in the dynamic range, as shown at the right-hand in said FIG. (a), are cut, resulting in producing white crushing or signals under the lower conversion reference voltage value VRT (for example, 3 volts) in the dynamic range are cut, resulting in producing black crushing.

Further, when the contour emphasizing quantity of the contour extracting circuit 14 is "large", there are problems that signals over the dynamic range of the A/D conversion circuit as shown at the left-hand side in FIG. 2(b) are cut, resulting in producing white crushing or signals under the lower conversion reference voltage value VRB are cut, resulting in producing black crushing.

The present applicant simultaneously proposes a contour emphasizing circuit as shown in FIG. 3 as a separate application to solve the above mentioned problems. That is to say, by generating a Y signal after converting analog color video signals to digital signals by the A/D conversion circuit and by constituting so that digital video signals which are contour-emphasized will be obtained from adding the contour component extracted from this Y signal to digital color video signals from the A/D conversion circuit, it has been designed so that the contour emphasizing component, unlike the conventional example, will not surpass the dynamic range of the A/D conversion circuit.

However, when a signal processing circuit is added to carry out the signal processing like picture element number, gamma correction, etc. to this proposed contour emphasizing circuit, there is a problem that the contour emphasizing effect is reduced by half according to the position for adding this signal processing circuit.

For example, as shown in FIG. 3, when the signal processing circuit 35 for carrying out the picture element number conversion and gamma correction is added to the back stage of contour adders 34r, 34g and 34b, there is a problem.

The circuit shown in FIG. 3 is constituted by A/D conversion circuits 30r, 30g and 30b, a first phase adjustment circuit 31 composed of line memories 31r, 31g and 31b, a second phase adjustment circuit 33, contour adders 34r, 34g and 34b, a signal processing circuit 35, a Y signal generation circuit 36, a contour extracting circuit 38, a gain controller 40 for the contour components, and a coefficient multiplication circuit 42.

Hence, analog R, G and B signals input to input terminals 44r, 44g and 44b are converted to digital signals by A/D conversion circuits 30r, 30g and 30B, phase-adjusted by first and second phase adjustment circuits 31 and 33, and input to contour adders 34r, 34g and 34b. The Y signal generation circuit generates Y signals from digital R, G and B signals, the contour extracting circuit 38 extracts a contour component from a Y signal, this extracted contour component enters in contour adders 34r, 34g and 34b through the gain controller 40 and the coefficient multiplication circuit 42, and are added to the original digital R, G and B signals. For digital R, G and B signals contour-emphasized by those contour adders 34r, 34g and 34b, the signal processing like picture element number conversion, gamma correction, etc. is carried out by the signal processing circuit 35 and supplied to the display device through output terminals 86r, 86g and 86b, and contour-emphasized videos are displayed.

At this time, contour adders 34r, 34g and 34b add contour components as shown in the same figure (b) output from multipliers 86r, 86g and 86b of the coefficient multiplication circuit 42 to input signals R, G and B as shown in FIG. 4(a) from the second phase adjustment circuit 33, and output R, G and B signals contour-emphasized as shown in the same figure (c). However, there is a problem that the contour emphasizing effect comes to be reduced by half by the signal processing circuit 35 at the later stage.

Next, functions that the contour emphasizing effect as described above is reduced by half will be explained employing FIGS. 5 and 6. FIG. 5 shows a case that the picture element number conversion is carried out to adjust the sampling picture element number to the display picture element number of the display device, and if the rate conversion is carried out making the sampling picture element number to ½, as shown in the same figure (b), against the original signal shown in the same figure (a), signals output from output terminals 86r, 86g and 86b become as shown in the same figure (c). Since this output signal causes, as shown in FIG. 5(c), a difference in step, resulting in a deviating linearity, as well as becoming a different signal from the original signal in terms of balance of undershoot and overshoot, and when a video is displayed by supplying it to the display device, there is a problem that even though contour emphasis is carried out, the contour emphasizing effect comes to be reduced by half giving an unnatural property to the videos. In FIG. 5(b) and (c), S1 through S4 express sampling points, U1 expresses the size of the undershoot, and O1 expresses the size of the overshoot.

FIG. 6 shows a case where gamma correction is carried out to correct the display characteristic of the display device, and if gamma correction employing the input-output signals shown in the same figure (b) against the original signal shown in the same figure (a) is carried out, signals outputted from output terminals 86r, 86g and 86b become as shown in the same figure (c). As shown in FIG. 6(c), since the undershoot and overshoot become completely different values from the proper reasonable value that the undershoot and overshoot show in the same figure (a), there is a problem that dislocation is produced in the contour emphasizing component and the contour emphasizing effect comes to be reduced by half. In FIG. 6(c), U2 expresses the size of undershoot, and O2 expresses the size of overshoot.

The present invention has been carried out taking into account problems as described above, aims at providing a contour emphasizing circuit that can prevent the contour emphasizing effect from being reducing by half by the added signal processing circuit, as well as contour emphasized videos without white crushing or black crushing can be displayed by a display device driven by digital video signals, when a large amplitude signal capable of producing white crushing or black crushing by the contour emphasizing circuit in FIG. 1 is input and also when the contour emphasizing quantity is enlarged.

DISCLOSURE OF THE INVENTION

The contour emphasizing circuit according to the present invention is characterized by being provided with an A/D conversion circuit for converting analog color video signals (for example, R, G and B signals) to digital color video signals, a signal processing circuit for carrying out signal processing like picture element number conversion, gamma correction, etc. to an output signal of this A/D conversion circuit, a Y signal generation circuit for generating a Y signal from an output signal of this signal processing circuit, a contour extracting circuit for extracting a contour component from the generated Y signal, and a contour adder for outputting a contour-emphasized signal from adding this extracted contour component to an output signal of said signal processing circuit.

Since a Y signal is obtained after converting analog color video signals to digital signals by the A/D conversion circuit and a contour component extracted from this Y signal is added to digital color video signals output from the signal processing circuit, the contour emphasizing component, unlike the conventional example, does not surpass the dynamic range of the A/D conversion circuit. For this reason, when analog color video signals input to the contour emphasizing circuit of the present invention are large amplitude signals, or even when the contour emphasizing quantity is enlarged, neither white crushing nor black crushing is produced when the contour emphasizing video outputting a signal from the contour emphasizing circuit of the present invention to the display device driven by digital video signals is displayed. Further, the contour adder is placed behind the signal processing circuit and it has been designed to add a contour component to digital video signals after carrying out the signal processing like picture element number conversion, gamma correction, etc., influences to a contour component by the signal processing like picture element conversion, gamma correction, etc. can be carried out, preventing the contour emphasizing effect from being reduced by half.

Hence, said Y signal generation circuit is not limited to generating a Y signal from an output signal of the signal processing circuit, but may also generate a Y signal from an output signal of the A/D conversion circuit.

Further, said signal processing circuit may be constituted by two signal processing circuits of a picture element number conversion circuit for carrying out the picture element number conversion and a gamma correction circuit for carrying out the gamma-correction circuit, and it may be constituted by a signal processing circuit of one side of a picture element number conversion circuit and a gamma-correction circuit.

Further, to be able to display videos having emphasized contours in the vertical direction and horizontal direction from video signals having an added vertical contour component and horizontal contour component, the contour extracting circuit is constituted by first and second line memories, a vertical contour extracting circuit, a contour emphasizing frequency setting circuit, a horizontal contour extracting circuit and a contour synthesis circuit.

Further, to simplify the circuit configuration of the contour emphasizing frequency setting circuit, the contour emphasizing frequency setting circuit is constituted by four 1-dot delay elements connected in series. A Y signal of 2-dot delay is output from the second 1-dot delay element, and a Y signal of 4-dot delay is output from the fourth 1-dot delay element.

Further, to eliminate noise, in the contour extracting circuit, a core ring circuit for suppressing a contour component of less than a certain level is installed.

Further, to be capable of enlarging the contour emphasizing quantity, a gain controller for adjusting for output the size of the contour component extracted by the contour extracting circuit and a coefficient multiplication circuit outputs to the contour adder, multiplying coefficients Kr, Kg and Kb of less than 1 to its output signal.

BEST MODE TO CARRY OUT THE INVENTION

Below, the present invention will be explained on the basis of the attached drawings.

Figure 3:
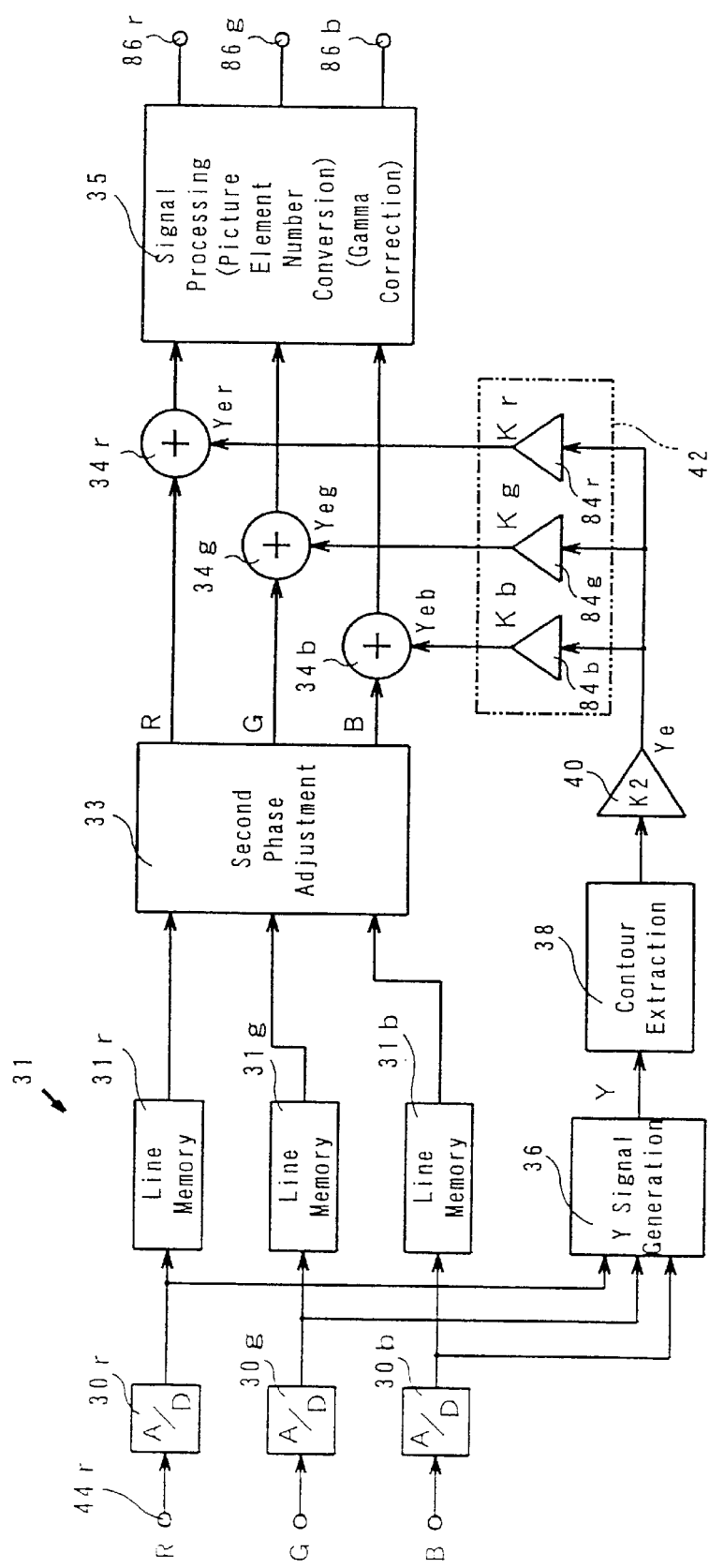
FIG. 3 is a block diagram showing the case in which the signal processing circuit is added to the final stage of the contour emphasizing circuit which the present applicant proposes as a separate application and the contour emphasizing effect is reduced by half.
Figure 4:
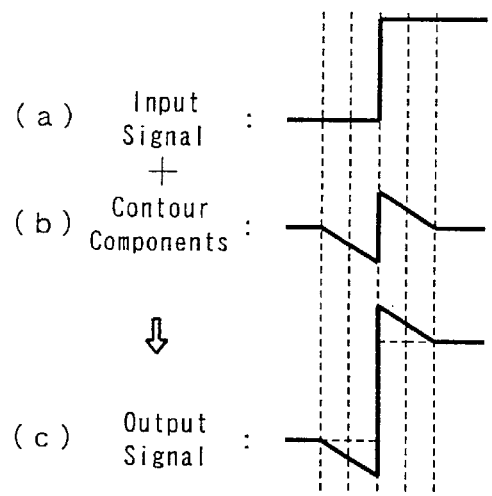
FIG. 4 is a waveform drawing of signals input to and output from contour adders 34r, 34g and 34b in FIG. 3; (a) is a waveform drawing of a signal input from the second phase adjustment circuit, (b) is a waveform drawing of a contour component input from the coefficient multiplication circuit 42, and (c) is a waveform drawing of an output contour-emphasized signal.
Figure 7:
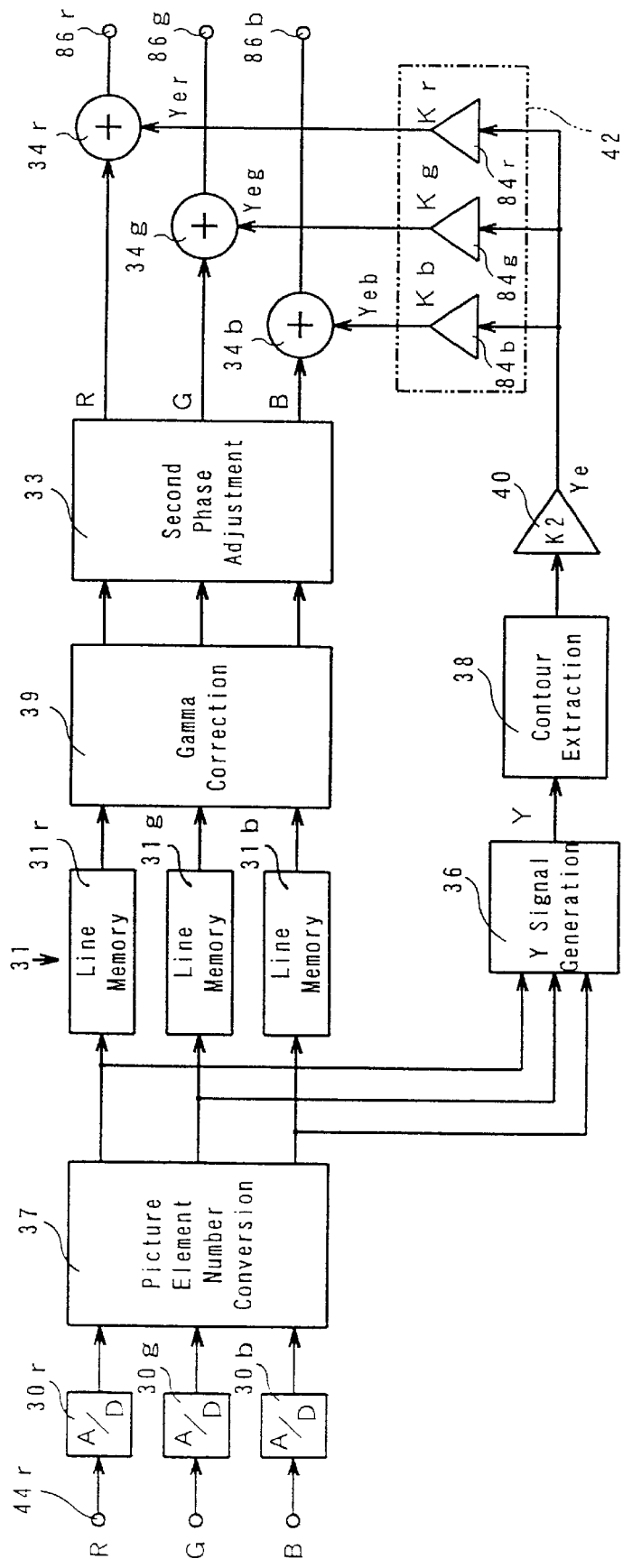
FIG. 7 is a block diagram showing an embodiment of the contour emphasizing circuit according to the present invention.

FIG. 7 shows an embodiment of the present invention, and the same elements as FIG. 3 will have the same code.

In FIG. 7, numerals 30r, 30g and 30b denote A/D conversion circuits, numeral 37 is a picture element number conversion circuit as an example of the signal processing circuit, numeral 31 is a first phase adjustment circuit composed of line memories 31r, 31g and 31b, numeral 39 is a gamma-correction circuit as another example of the signal processing circuit, numeral 33 is a second phase adjustment circuit, numerals 34r, 34g and 34b are contour adders, numeral 36 is a Y signal generation circuit, numeral 38 is a contour extracting circuit, numeral 40 is a gain controller, and numeral 42 is a coefficient multiplication circuit.

Said A/D conversion circuits 30r, 30g and 30b are constituted so that analog R, G and B signals input to input terminals 44r, 44g and 44b will be converted to digital R, G and B signals of 8-bits resolution, respectively.

Said picture element number conversion circuit 37 is constituted so that signals that carried out the picture element number conversion from the output signals of said A/D conversion circuits 30r, 30g and 30b will be output. This picture element number conversion expresses, to make the sampling picture element number agree with the display picture element number, the signal processing for carrying out the rate conversion of the sample number of digital R, G and B signals output from A/D conversion circuits 30r, 30g and 30b.

Line memories 31r, 31g and 31b of said first phase adjustment circuit 31 are constituted to receive an output line of said picture element number conversion circuit 37 and output a signal delayed in the portion of 1 line, respectively.

Said gamma-correction circuit 39 is constituted so that a signal that carried out gamma correction to an output signal of said first phase adjustment circuit 31 is output. This gamma correction expresses the signal processing for correcting the display characteristics of the display device. Said second phase and adjustment circuit 33 is constituted so that an output signal of said gamma-correction circuit 39 will be phase-adjusted for output to the input side of one side of said contour adders 34r, 34g and 34b.

The phase adjustment processing by said first phase adjustment circuit 31 and second phase adjustment circuit 33 expresses the processing for adjusting the delay difference between the delay time required for the gamma processing of said gamma-correction circuit 39 and the delay time required for the signal processing in the gain controller 40 and coefficient multiplication circuit 42.

Figure 8:
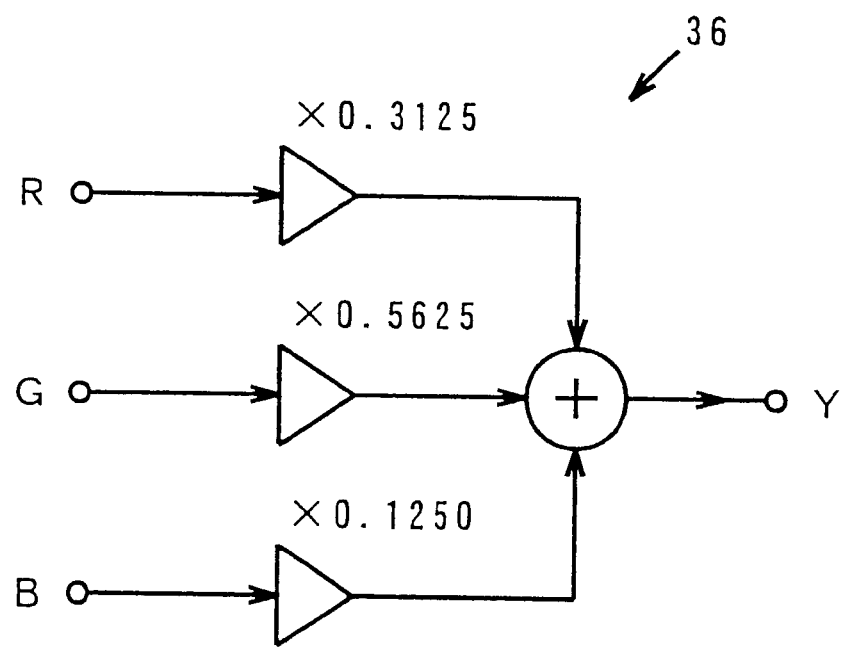
FIG. 8 is a block diagram showing an example of the Y signal generation circuit in FIG. 7.

Said Y signal generation circuit 36 is constituted so that Y (luminance) signals will be generated from digital R, G and B signals output from said A/D conversion circuits 30r, 30g and 30b. This Y signal generation circuit 36 is, for example, by using a ROM (Read only Memory) as the LUT (Look Up Table), realized by the method of obtaining Y signals by adding R, G and B signals at the mixing ratio specified by the NTSC (National Television System Committee) standard to satisfy the following equation (5) or by the method of obtaining an approximate value of Y signals to satisfy the following equation (6) by bit shift addition as shown in FIG. 8.

$$Y=(0.3 \times R)+(0.59 \times G)+(0.11 \times B) \tag{5}$$

$$Y=0.3125 \times R+0.5625 \times G+0.1250 \times B \tag{6}$$

Said contour extracting circuit 38 is constituted so that a contour component will be extracted for output from a Y signal generated by said Y signal generation circuit 36. This contour extracting circuit 38 is constituted specifically as shown in FIG. 9.

Figure 9:
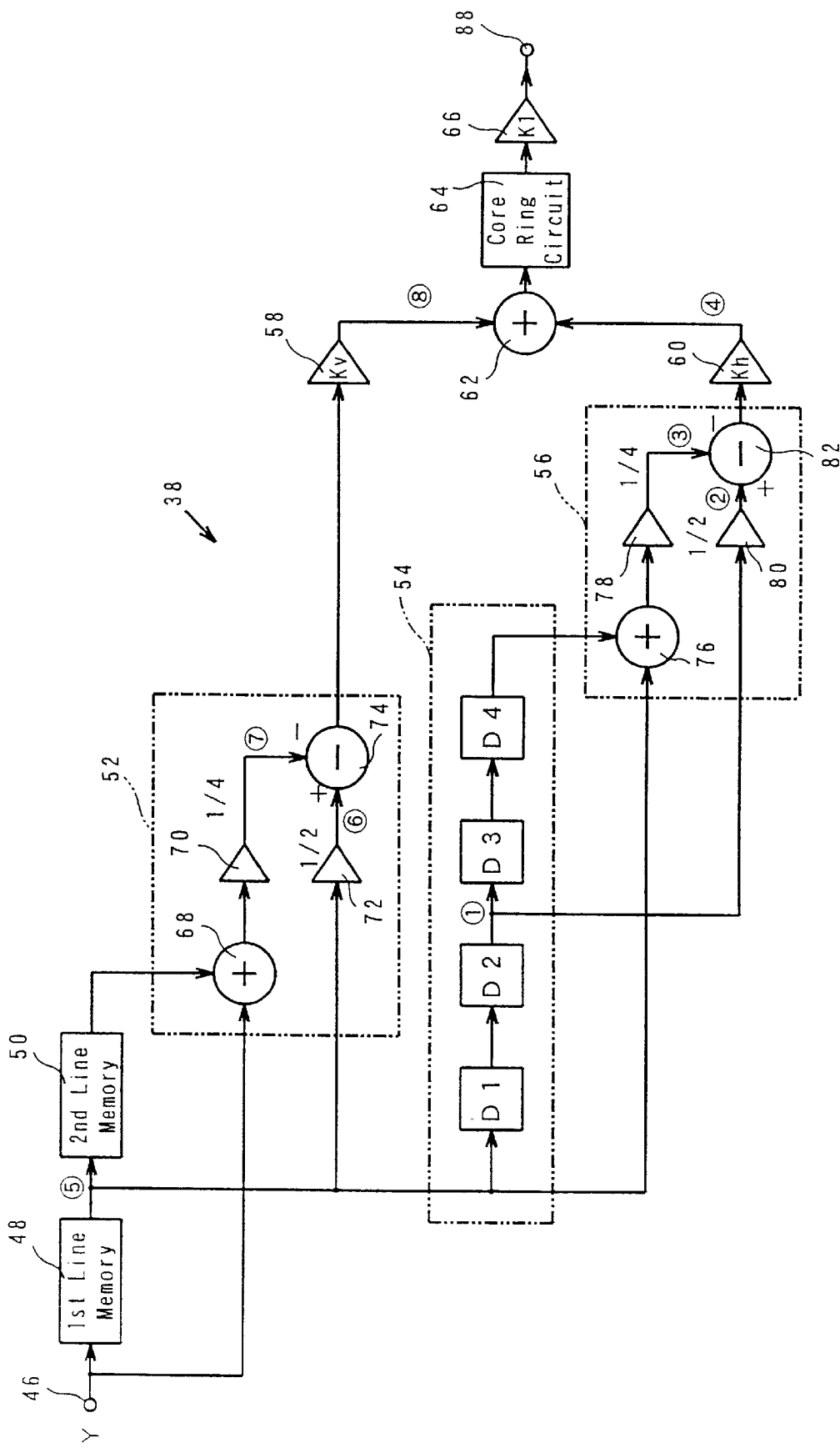
FIG. 9 is a block diagram showing an example of the contour extracting circuit in FIG. 7.

In FIG. 9, numeral 46 denotes an input terminal of a Y signal, numerals 48 and 50 are first and second line memories as 1-line delay elements, numeral 52 is a vertical contour extracting circuit, numeral 54 is a contour emphasizing frequency setting circuit, numeral 56 is a horizontal contour extracting circuit, numeral 58 is a gain controller for a vertical contour component, numeral 60 is a gain controller for a horizontal contour component, numeral 62 is a contour synthesis circuit, numeral 64 is a core ring circuit, and numeral 66 is a gain controller.

Said first and second line memories 48 and 50 are constituted so that a Y signal is input to said input terminal 46 and Y signals delayed gradually in the portion of 1 line (portion of 1 scanning line) are generated for output.

Said vertical contour extracting circuit 52 consists of an adder for adding for output a Y signal input to said input terminal 46 and a Y signal of 2-line delay output from said second line memory 50, a multiplier 70 for multiplying for output a coefficient (¼) to an output signal of this adder 68, a multiplier 72 for multiplying for output a coefficient (½) to a Y signal of 1-line delay output from said first line memory 48, and a subtracter 74 for subtracting an output signal of said multiplier 70 from an output signal of said multiplier 72.

Figure 5:
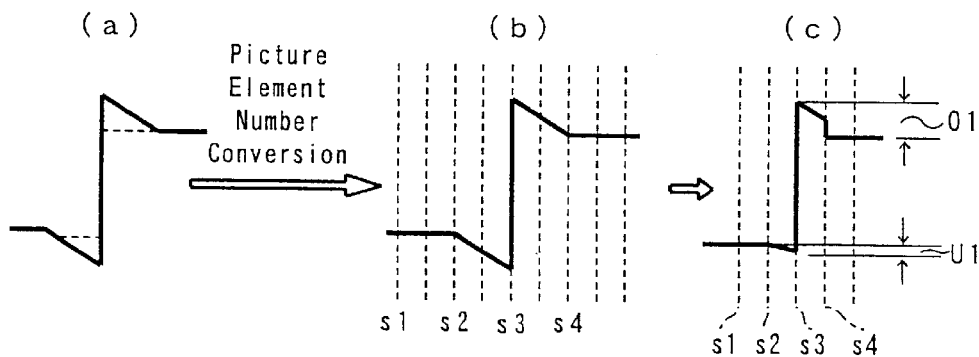
FIG. 5 is a signal waveform figure explaining the picture element number conversion by the signal processing circuit 35 in FIG. 3; (a) is a waveform drawing of an input signal, (b) is a drawing showing a sampling point when the sampling picture element number is made as ½, and (c) is a waveform drawing of an output signal.

Said contour emphasizing frequency setting circuit 54 is a circuit for setting the contour emphasizing frequency to the specified frequency (for example, ½ of the sampling frequency Fs), specifically, as shown in FIG. 5, and is constituted by the 5-tap type composed of four 1-dot delay elements D1 through D4 for delaying Y signals output from said first line memory 48 gradually in the portion of 1 dot (portion of 1 picture element). Each of said 1-dot delay elements D1 through D4 is, for example, constituted by a D-FF (D type flip flop). In this respect, said contour emphasizing frequency setting circuit 54 is not limited to the 5-tap type, but may be of the 7-tap type composed of six 1-dot delay elements D1 through D6 connected in series.

Said horizontal contour extracting circuit 56 consists of an adder 76 for adding a Y signal output from said first line memory 48 and a Y signal of 4-dot delay output from the fourth 1-dot delay element D4, a multiplier 78 for multiplying for output a coefficient (¼) to an output signal to this adder 76, a multiplier 80 for multiplying for output a coefficient (½) to a Y signal of 2-dot delay output from the second 1-dot delay element D2, and a subtracter 82 for subtracting an output signal of said coefficient device 78 from an output signal of said coefficient device 80.

Said gain controller 58 is constituted so that an adjustable coefficient Kv will be multiplied for output to a vertical contour component extracted by said vertical extracting circuit 52.

Said gain controller 60 is constituted so that an adjustable coefficient Kh will be multiplied for output to a horizontal contour component extracted by said horizontal contour extracting circuit 56. Said contour synthesis circuit 62 is constituted so that a contour component output, respectively, from said gain controllers 58 and 60 will be synthesized for output.

Figure 10:
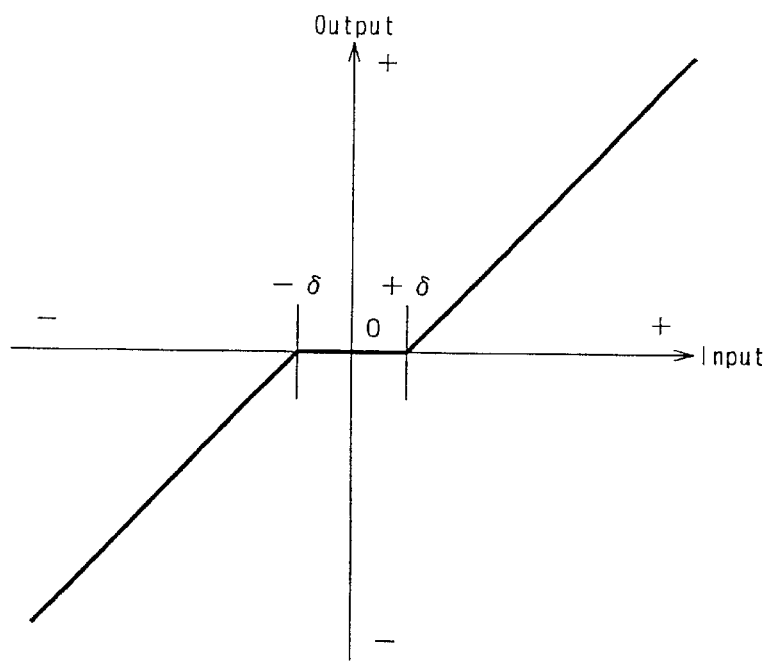
FIG. 10 is a characteristic drawing of the core ring circuit in FIG. 9.

Said core ring circuit 64 eliminates noise and minute contour components and receives a contour component output from said contour synthesis circuit 62 as an input, and is constituted so that a contour component of less than a certain level will be suppressed for output. Said core ring circuit 64 is, for example, constituted so that input-output characteristics as shown in FIG. 10 will be available. Specifically, when the contour component input from the contour synthesis circuit 62 is positive and larger than 0 it is constituted so that −δ (δ is a positive constant) will be added for output to the original component, and when it is negative and smaller than 0, +δ will be added for output to the original component, and when its operation result is more than −δ and less than +δ, the output will be fixed to 0.

Said gain controller 66 is constituted so that an adjustable coefficient k1 will be multiplied to a contour component output from the core ring circuit 64 and sent to the output terminal 88.

Said gain controller is constituted so that an adjustable coefficient k2 is multiplied for output to a contour component output from said contour extracting circuit 38.

One of said gain controllers 66 and 40 may be omitted (for example, 66) if need arises.

Said coefficient multiplication circuit 42 is constituted by multipliers 86r, 86g and 86b for outputting contour components Yer, Yeg and Yeb for R, G, and B by multiplying coefficients Kr, Kg and Kb to a contour component output from said gain controller 40. Said coefficients Kr, Kg and Kb are not limited to this, but said Y signal generation circuit 36 is set to (Kr+Kg+Kb=1) 0.3125, 0.5625 and 0.1250, as the same values as the coefficients (FIG. 8) of R, G and B employed to generate a Y signal so that it will be able to be obtained by the bit shift addition.

Said contour adders 34r, 34g and 34b are constituted so that contour components Yer, Yeg and Yeb output from the coefficient devices 86r, 86g and 86b of said coefficient multiplication circuit 42 will be added to R, G and B signals output from said second phase adjustment circuit and output to the display device through output terminals 86r, 86g and 86b.

Next, functions will be explained.

(1) In FIG. 3, analog R, G and B signals input to input terminals 44r, 44g and 44b are converted to 8-bits digital R, G and B signals by A/D conversion circuits 30r, 30g and 30b, picture element number-converted by the picture element number conversion circuit 37, phase-adjusted by the first phase adjustment circuit 31, gamma corrected by the gamma-correction circuit 39, phase-adjusted by the second phase adjustment circuit 33, and enters in the output side of one side of the contour adders 34r, 34g and 34b.

(2) The Y signal generation circuit 36 generates Y signals from digital R, G and B signals output from A/D conversion circuits 30r, 30g and 30b. For example, this Y signal generation circuit 36 generates Y signals from digital R, G and B signals by bit shift addition employing a circuit in FIG. 8.

(3) The contour extracting circuit 38 extracts a contour component composed of a horizontal contour component and a vertical contour component from the Y signals. Next, the extraction function of the contour component by this contour extracting circuit 38 will be explained employing FIG. 9.

(3a) The function of extracting a horizontal contour component which is a high-pass component in the horizontal direction of a Y signal will be explained referring to FIG. 11.

Figure 11:
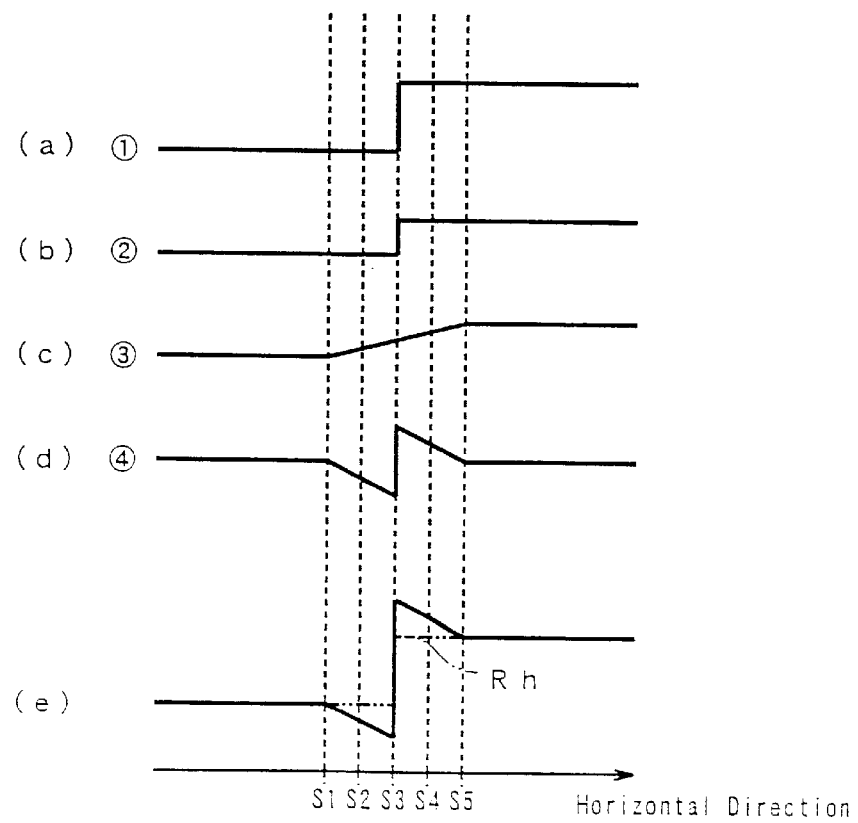
FIG. 11 shows signal waveforms relating to the contour emphasis in horizontal direction; (a) is a waveform drawing of signal (1) in FIG. 9, (b) is a waveform drawing of signal (2) in FIG. 9, (c) is a waveform drawing of signal (3) in FIG. 9, (d) is a waveform drawing of signal (4) in FIG. 9, and (e) is a waveform drawing of the horizontal direction component of a signal output to the output terminal in FIG. 7.

Vertical lines S1, S2, S3, S4 and S5 expressed by dotted lines in FIG. 11 are sampling points of each picture element in order consecutively in the horizontal direction along the scanning line including the processing object picture element.

When outputting a Y signal from the second 1-dot delay element D2 of the contour emphasizing frequency setting circuit 54 as a signal (1) as shown in (a) in FIG. 11, a signal (2) output from the multiplier 80 of the horizontal contour extracting circuit 56 becomes as shown in the same drawing (b), and inputted to the + side of the subtracter 82.

A Y signal output from the first line memory 48 and a Y signal output from the fourth 1-dot delay element D4 of the contour emphasizing frequency setting circuit 54 are added by the adder 76 of the horizontal contour extracting circuit 56, multiplied by ¼ by the multiplier 78, and as shown in FIG. 11(c), input to the − side of the subtracter 82 as a signal (3). Signals ((2) and (3)) operated by this subtracter 82 are multiplied by coefficient Kh by the gain controller 60, and input to the input side of one side of the contour synthesis circuit 62 as a signal (4) as shown in FIG. 11 (d).

(3b) The function of extracting a vertical contour component which is a high-pass component in the vertical direction of a Y signal, referring to FIG. 12, will be explained.

Figure 12:
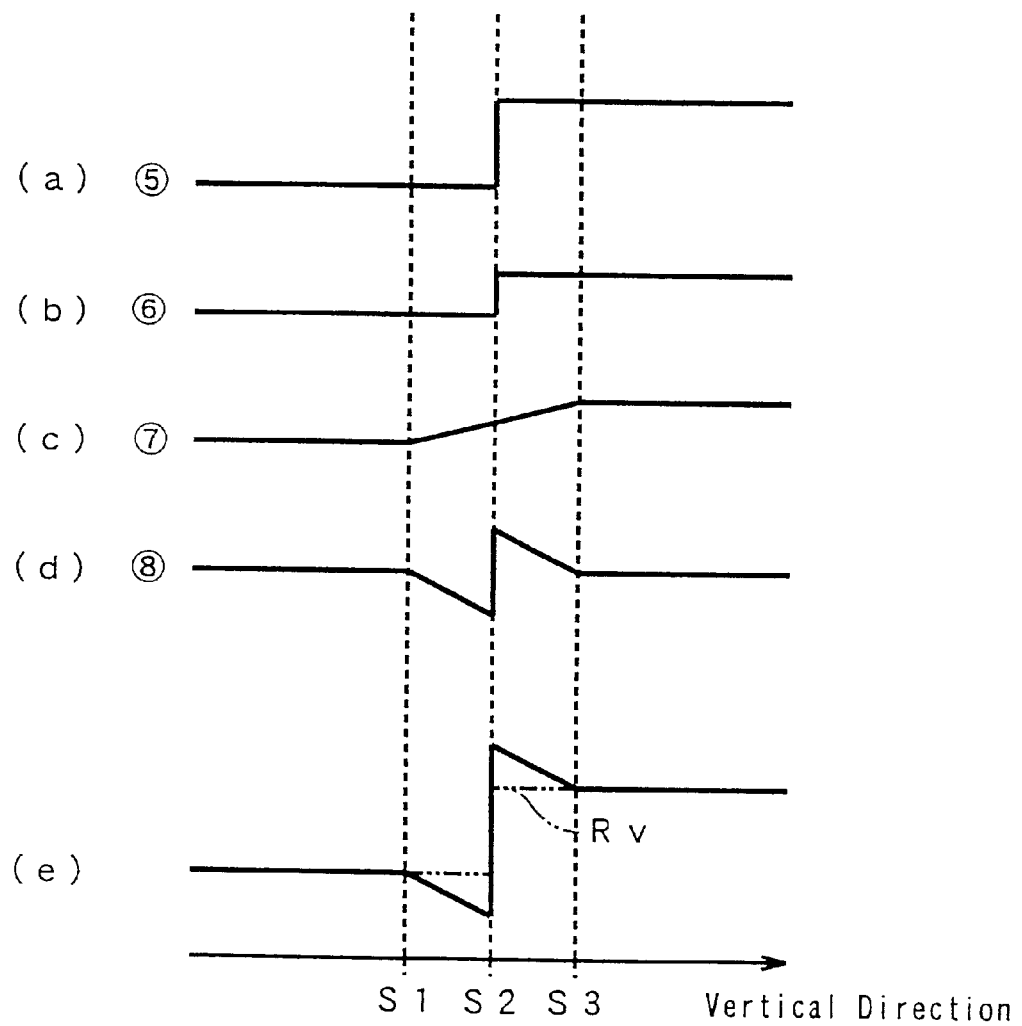
FIG. 12 shows the signal waveform relating to contour emphasis in the vertical direction; (a) is a waveform drawing of signal (5) in FIG. 9, (b) is a waveform drawing of signal (6) in FIG. 9, (c) is a waveform drawing of signal (7) in FIG. 9, (d) is a waveform drawing of signal (8) in FIG. 9, and (e) is a waveform drawing of the vertical direction component of a signal output to the output terminal 86r in FIG. 9.

Vertical lines S1, S2 and S3 expressed by dotted lines in FIG. 12 are picture elements on three scanning lines of a scanning line and back and forward scanning lines including processing object picture elements, and express sampling points of three picture elements in order in the vertical direction including processing object picture elements.

When making a Y signal of 1-line delay output from the first line memory 48 as (5) as shown in FIG. 12(a), a signal (6), as shown in FIG. 12 (c) output from the multiplier 72 of the vertical contour extracting circuit 52 becomes as shown in the same figure, and inputs to the + side of the subtracter 74.

A Y signal input to the input terminal 46 and a Y signal of 2-line delay output from the second line memory 50 are added by the adder 68 of the vertical contour extracting circuit, multiplied by ¼ by the multiplier 70, and as shown in FIG. 12(c), input to the − side of the subtracter 74 as a signal (7). Signals ((6) and (7)) operated on by this subtracter 74 are multiplied by coefficient Kv by the gain controller 58, and input to another input side as a signal (8) shown in FIG. 12(d).

(3c) A signal (4) expressing a horizontal contour component and a signal expressing a vertical contour component (8) are synthesized by the contour synthesis circuit 62, contour components of less than a certain level are suppressed by the core ring circuit 64 to eliminates noise, multiplied by the coefficient K1 by the gain controller 66 for level adjustment, and output to the output terminal 88., multiplied by the coefficient K1 by the gain controller 66 for level adjustment, and output to the output terminal 88.

(4) A contour component output to the output terminal 88 is multiplied for level adjustment by the coefficient K2 by the gain controller 40, multiplied by coefficients Kr, Kg and Kb by multipliers 86r, 86g and 86b for R, G and B, becomes contour components Yer, Yeg and Yeb for R, G and B, and input to another input side of the corresponding contour adders 34r, 34g and 34b.

For this reason, the contour emphasizing quantity can be enlarged.

(5) Digital R, G and B signals output from the second phase adjustment circuit 33 and contour components Yer, Yeg and Yeb output from multipliers 86r, 86g and 86b of the coefficient multiplication circuit are added by contour adders 34r, 34g and 34b, and output in the display device through output terminals 86r, 86g and 86b, and a video contour-emphasized by this display device is displayed.

At this time, horizontal direction components of (R+Yer) signals output to the output terminal 86r come to be as shown in FIG. 11(e), and vertical direction components become as shown in FIG. 12(e). Rh and Rv shown by two-dot chain lines in FIGS. 11(e) and 12(e) expresses horizontal direction components and vertical direction components of R signals output from the signal processing/phase adjustment circuit 32.

Likewise, horizontal direction components and vertical direction components of (G+Yes) and (B+Yeb) signals output to output terminals 86g and 86b become similar to horizontal direction components and vertical direction components of (R+Yer) signals output to the output terminal 86r.

Figure 1:
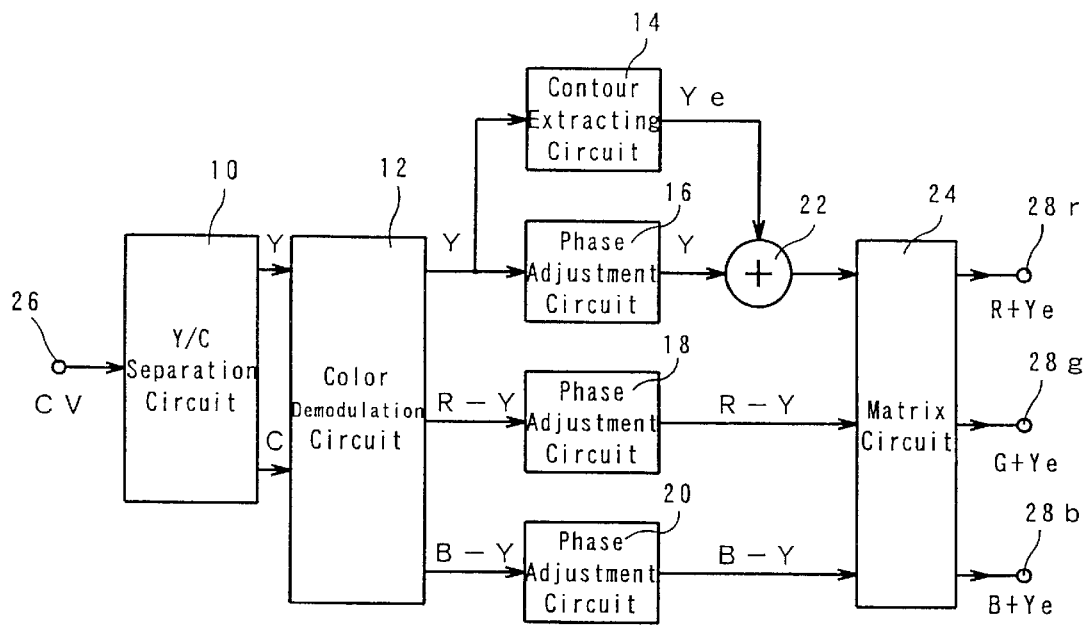
FIG. 1 is a block diagram showing a contour emphasizing circuit of a conventional example.
Figure 2:
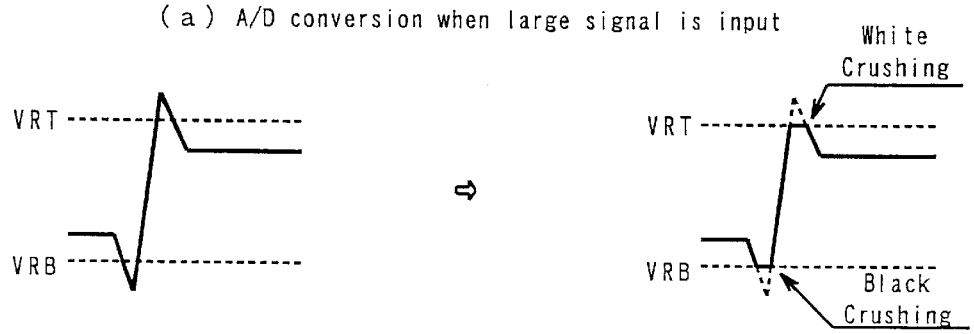
FIG. 2 shows problems when the signal obtained by the circuit in FIG. 1 is A/D converted and output to the display device; (a) is a figure showing that white crushing and black crushing are produced when large amplitude signals are input, and (b) is a drawing showing that white crushing and black crushing are produced when the contour emphasizing quantity is enlarged.
Figure 2:
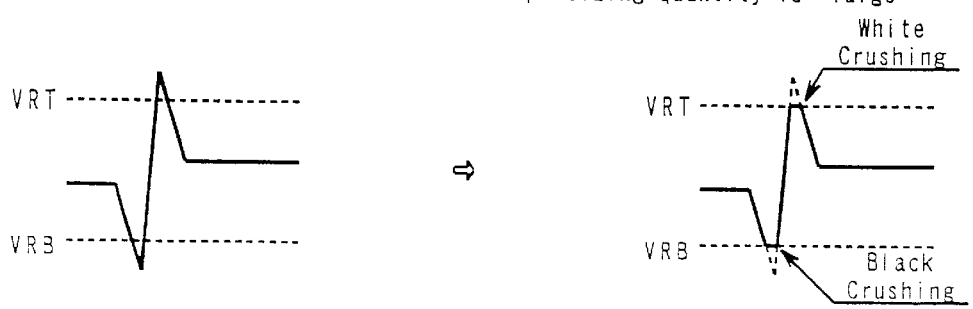

(6) As described above, since it is designed to generate Y signals after converting analog R. G and B signals to digital R, G and B signals by A/D conversion circuits 30r, 30g and 30b, and to add contour components extracted from these Y signals to the original digital R, G and B signals, the contour emphasizing component, unlike the conventional example shown in FIG. 1, does not surpass the dynamic range of a/1) conversion circuit. For this reason, when analog R, G and B signals input to the contour emphasizing circuit of the present invention are large amplitude signals, or even when the contour emphasizing quantity is enlarged, neither white crushing nor black crushing is produced when displaying the video by outputting signals from the contour emphasizing circuit of the present invention to the display device driven by digital R, G and B signals.

Figure 6:
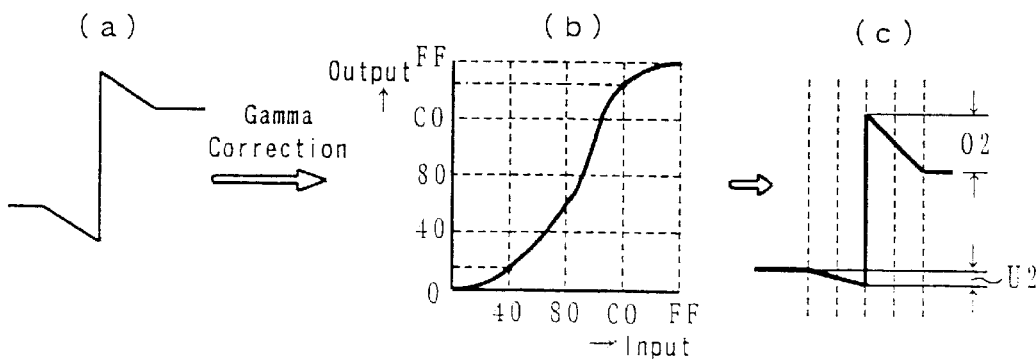
FIG. 6 is a signal waveform drawing explaining gamma correction by the signal processing circuit 35 in FIG. 3; (a) is a waveform drawing of the input signal, (b) is an input/output characteristic drawing for gamma correction, and (c) is a waveform drawing of an output signal.

(7) Further, since contour components Yer, Yeg and Yeb are added to digital R, G and B signals after carrying out the signal processing of picture element number conversion and gamma correction by placing contour adders 34r, 34g and 34b behind the picture element number conversion circuit 37 and gamma-correction circuit 39, influences to the contour components are eliminated by the picture element number conversion and gamma correction as shown in FIGS. 5 and 6, which can prevent the contour emphasizing effect from being reduced by half.

In said embodiment, it has been designed so that the contour emphasizing quantity for r, G and B may be enlarged by multiplying coefficients Kr, Kg and Kb (Kr+Kg+Kb=1) of less than 1 to its output signal to the gain controller 40 for adjusting for output the size of the contour component extracted by the contour extracting circuit 38 and installing the coefficient multiplication circuit 42 to output to contour adders 34r, 34g and 34b, however, the present invention is not so limited, and the gain controller 40 and coefficient multiplication circuit 42 can be omitted and the output of the contour extracting circuit 38 sent directly to contour adders 34r, 34g and 34b.

In said embodiment, it is designed to eliminate noise by installing a core ring circuit 64 for suppressing an output less than a certain level of a contour component output from the contour synthesis circuit, however the present invention is not limited to this, and this core ring circuit 64 can be omitted.

In said embodiment, the contour extracting circuit 38 is constituted by first and second line memories 48 and 50, a vertical contour extracting circuit 52, a contour emphasizing frequency setting circuit 54, a horizontal contour extracting circuit 56, gain controllers 58 and 60, and a contour synthesis circuit 62 for outputting contour components synthesized from a vertical contour component and a horizontal contour component, however, the present invention is not limited to this, and the contour extracting circuit 38 may provide at least a contour emphasizing frequency setting circuit 54 and a horizontal contour extracting circuit 56 to output a horizontal contour component.

In said embodiment, the signal processing circuit consists of a picture element number conversion circuit and a gamma-correction circuit gradually connected to the output side of the A/D conversion circuit, which is constituted so that the Y signal generation circuit will produce a Y signal from an output signal of the picture element number conversion circuit, however, the present invention is not limited to this.

For example, a signal processing circuit consisting of a gamma-correction circuit and a picture element number conversion circuit gradually connected to the output side of the A/D conversion circuit can be also utilized so that the Y signal generation circuit will generate Y signals from an output signal of the gamma-correction circuit.

Or else, it can be utilized also so that the signal processing circuit consists of one side of a gamma-correction circuit and a picture element number conversion circuit connected to the output side of the A/D conversion circuit, the Y signal generation circuit generates a Y signal from an output signal of the A/D conversion circuit, or the Y signal generation circuit generates a Y signal from an output signal of the gamma-correction circuit or picture element number conversion circuit.

INDUSTRIAL AVAILABILITY

As above, the contour emphasizing circuit according to the present invention can be utilized to display a video of high picture quality contour-emphasized on the basis of the input of analog color video signals by a display device (for example, matrix type display device) driven by digital color video signals like PDP, LCD, etc. Further, the contour emphasizing circuit can, when the signal processing circuit to carry out the signal processing of picture element number conversion, gamma correction, etc. is added, be utilized to prevent the contour emphasizing effect from being reduced by half.

What is claimed is:

1. A contour emphasizing circuit comprising an A/D conversion circuit for converting input analog R, G and B video signals to output R, G and B digital video signals, a signal processing circuit for producing processed digital video signals from the digital video signals, a Y signal generation circuit for generating a Y signal from an output signal of the signal processing circuit, a contour extracting circuit for extracting contour components from the Y signal, a gain controller for receiving the extracted contour components, multiplying the extracted contour components by an adjustable coefficient and outputting adjusted contour components, a coefficient multiplication circuit for receiving the adjusted contour components, multiplying by coefficients Kr, Kg and Kb, Kr, Kg and Kb being less than one, and outputting contour components for the processed R, G and B digital video signals and contour adders for adding the contour components for the processed R, G and B digital video signals to the processed R, G and B digital video signals, respectively.

2. The contour emphasizing circuit of claim 1, additionally comprising a core ring circuit for suppressing contour components of less than a specified level from being outputted.

3. The contour emphasizing circuit of claim 1, wherein the contour extracting circuit comprises first and second line memories connected in series for delaying a Y signal generated by the Y signal generation circuit, a vertical contour extracting circuit for extracting a vertical contour component on the basis of the Y signal generated from the Y signal generation circuit, a Y signal from the first line memory and a Y signal from the second line memory, a contour emphasizing frequency setting circuit comprising n 1-dot delay elements connected in series for generating two kinds of delayed Y signals consisting of an n-dot delayed Y signal from the $n^{th}$ 1-dot delay element a 2-dot delayed Y signal from the second 1-dot delay element for contour emphasizing frequency setting, based on a Y signal from said first line memory and n being at least four, a horizontal contour extracting circuit for extracting a horizontal contour component on the basis of the Y signal from the first line memory and the two kinds of delayed Y signals generated by the contour emphasizing frequency setting circuit, and a synthesis circuit for synthesizing output contour components from said vertical and horizontal contour extracting circuits, respectively.

4. The contour emphasizing circuit of claim 3, wherein the contour emphasizing frequency setting circuit comprises four 1-dot delay elements connected in series and outputs a 2-dot delay Y signal from the second 1-dot delay element and a 4-dot delay Y signal from the fourth 1-dot delay element.

5. A contour emphasizing circuit comprising an A/D conversion circuit for converting input analog R, G and B video signals to output R, G and B digital video signals, a signal processing circuit for producing processed R, G and B digital video signals from the R, G and B digital video signals, said signal processing circuit comprising a picture element number conversion circuit for carrying out picture element number conversion on an output signal of the AD conversion circuit and a gamma-correction circuit for carrying out gamma correction on an output of the picture element number conversion circuit, a Y signal generation circuit for generating a Y signal from an output signal of the picture element number conversion circuit, a contour extracting circuit for extracting contour components from the Y signal, a gain controller for receiving the extracted contour components, multiplying the extracted contour components by an adjustable coefficient and outputting adjusted contour components, a coefficient multiplication circuit for receiving the adjusted contour components, multiplying by coefficients Kr, Kg and Kb, Kr, Kg and Kb being less than one, and outputting contour components for the processed R, G and B digital video signals and contour adders for adding the contour components for the processed R, G and B digital video signals to the processed R, G and B digital video signals and produce contour-emphasized digital color video signals.

6. A contour emphasizing circuit comprising an A/D conversion circuit for converting input analog R, G and B video signals to output R, G and B digital video signals, a signal processing circuit for producing processed R, G and B digital video signals from the R, G and B digital video signals, said signal processing circuit comprising a picture element number conversion circuit for carrying out picture element number conversion on an output signal of the A/D conversion circuit and a gamma-correction circuit for carrying out gamma correction on an output of the picture element number conversion circuit, a Y signal generation circuit for generating a Y signal from an output signal of the picture element number conversion circuit, a contour extracting circuit for extracting contour components from the Y signal, a gain controller for receiving the extracted contour components, multiplying the extracted contour components by an adjustable coefficient and outputting adjusted contour components, a coefficient multiplication circuit for receiving the adjusted contour components, multiplying by coefficients Kr, Kg and Kb, Kr, Kg and Kb being less than one, and outputting contour components for the processed R, G and B digital video signals and a video reproducing unit comprising contour adders for adding the contour components for the processed R, G and B digital video signals to the processed R, G and B digital video signals and produce contour-emphasized digital color video signals.

* * * * *